(12) United States Patent
Sutton et al.

(10) Patent No.: US 7,703,324 B2
(45) Date of Patent: Apr. 27, 2010

(54) MEMS TUNING FORK GYRO SENSITIVE TO RATE OF ROTATION ABOUT TWO AXES

(75) Inventors: Michael S. Sutton, Roseville, MN (US); Mark W. Weber, Zimmerman, MN (US)

(73) Assignee: Honeywell International Inc., Morristown, NJ (US)

( * ) Notice: Subject to any disclaimer, the term of this patent is extended or adjusted under 35 U.S.C. 154(b) by 441 days.

(21) Appl. No.: 11/747,629

(22) Filed: May 11, 2007

(65) Prior Publication Data
US 2008/0276707 A1  Nov. 13, 2008

(51) Int. Cl.
*G01P 9/04* (2006.01)
(52) U.S. Cl. .................................. 73/504.12
(58) Field of Classification Search .............. 73/504.04, 73/504.12, 504.14, 504.16
See application file for complete search history.

(56) References Cited
U.S. PATENT DOCUMENTS 6,349,597 B1 * 2/2002 Folkmer et al. .......... 73/504.02
6,928,872 B2 * 8/2005 Durante et al. .......... 73/504.04
2008/0276706 A1 * 11/2008 Hartmann et al. ........ 73/504.04

* cited by examiner

Primary Examiner—John E Chapman
(74) Attorney, Agent, or Firm—Fogg & Powers LLC

(57) ABSTRACT

A two-axes rate sensing MEMS system. The system includes two proof masses, two drive components, two drive sense components, two orthogonal sets of substrate electrodes, and a processing device. The processing device is in signal communication with the two proof masses, the two sense components, or the two sets of substrate electrodes. The processing device determines the rate of rotation about two orthogonal axes based on signals received from the two proof masses, the two sense components, or the two substrate electrodes. Rotation about one axis will induce proofmass motion in the plane of the substrate. Rotation about an orthogonal axis will induce proofmass motion out-of-plane of the proofmasses. The sensing scheme independently detects these proof mass motion, which can infer rate of rotation.

8 Claims, 3 Drawing Sheets

US 7,703,324 B2

MEMS TUNING FORK GYRO SENSITIVE TO RATE OF ROTATION ABOUT TWO AXES

BACKGROUND OF THE INVENTION

In many inertial measurement systems, there is a need for measuring rotation about three orthogonal axes. Traditionally, measuring rate of rotation about three orthogonal axes is performed by three separate sensors (gyroscopes). Because each sensor consumes valuable space and is a very sensitive and expensive device, the cost of inertial measurement systems is quite large.

Therefore, there exists a need for reducing the complexity and cost of sensors and inertial measurement systems or comparable systems.

SUMMARY OF THE INVENTION

The present invention provides a two-axes MEMS gyroscope system. The system includes two proof masses, two drive components, two drive sense components, two Coriolis sense electrodes sensitive to out-of-plane proof mass motion, two Coriolis sense electrodes sensitive to in-plane proof mass motion, and a processing device. The processing device is in signal communication with the two proof masses, the drive electrodes, the drive sense components, the in plane Coriolis sense electrodes and the out of plane Coriolis sense electrodes. The processing device determines the rate of rotation about two orthogonal axes based on signals received from the two proof masses or the four Coriolis electrodes.

The two drive components and the two drive sense components form comb capacitors with respective proof masses.

In one aspect of the invention, bias voltages on the in-plane Coriolis sense electrodes are modulated at a first modulation frequency and the out-of-plane Coriolis sense electrodes are biased at a second modulation frequency. The processing device demodulates the signals received from the proof masses based on two previously defined modulation frequencies.

In another aspect of the invention, the proof masses are biased to predefined voltages. The processing device receives independent signals from the two sets of Coriolis electrodes.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
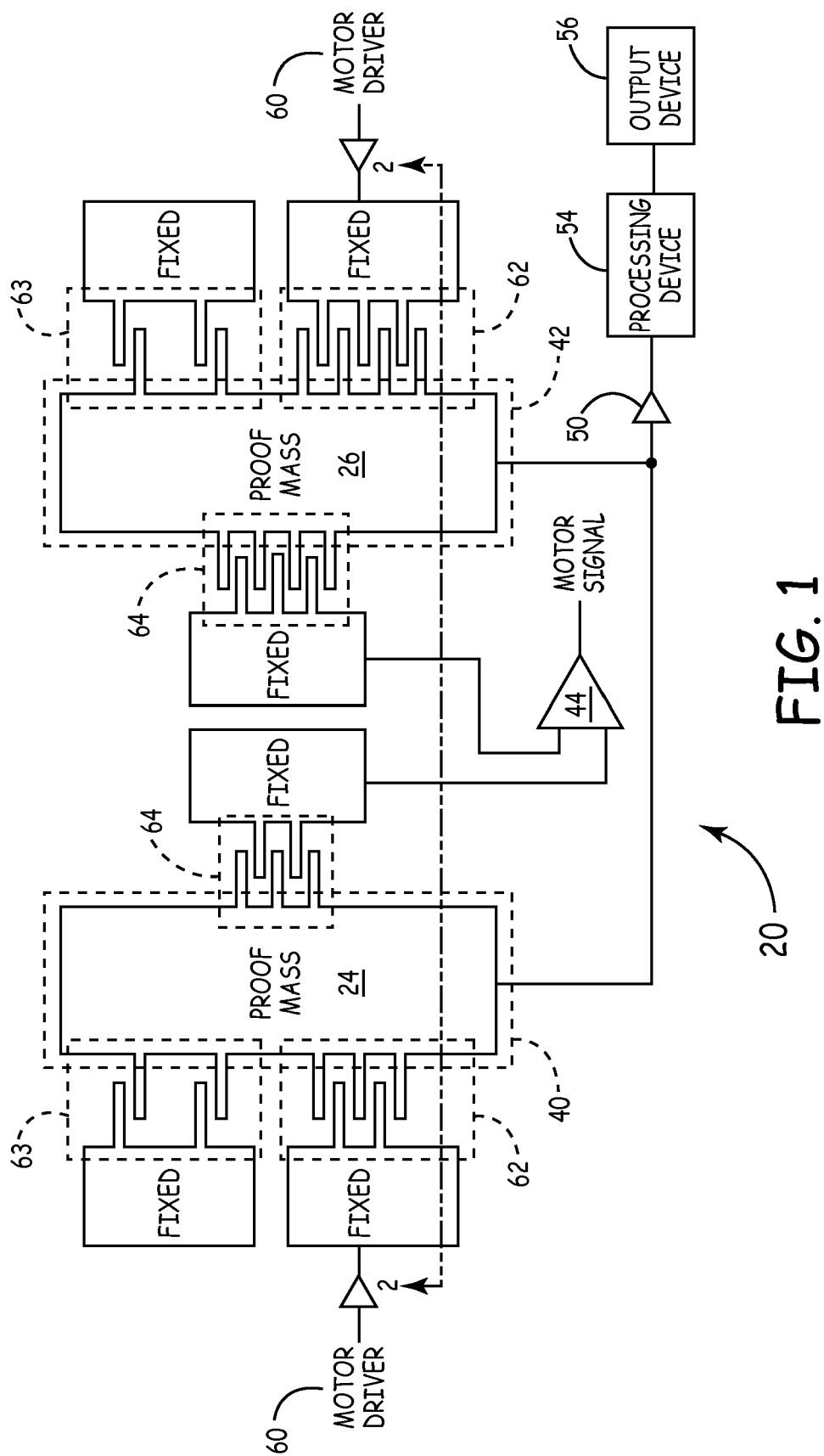
FIG. 1 illustrates a top-down view of an example two axes sensing gyro system formed in accordance with an embodiment of the present invention.
Figure 2:
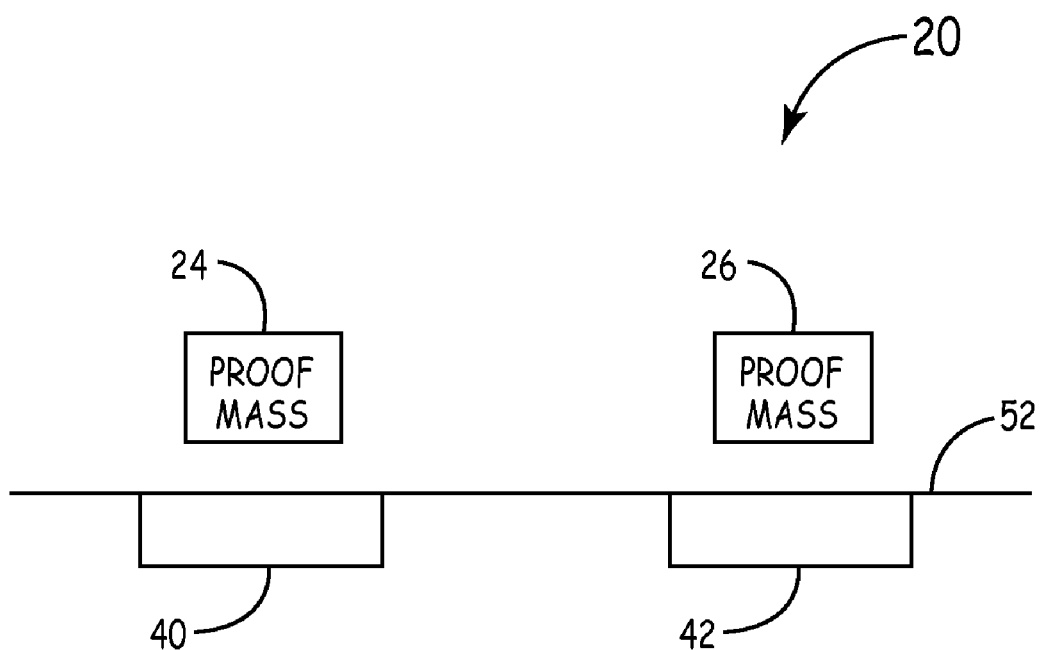
FIG. 2 illustrates a partial cross sectional view of the system of FIG. 1.

FIGS. 1 and 2 illustrate an example of a Micro Electro-Mechanical Systems (MEMS) sensor 20 that measures rate of rotation about two orthogonal axes. The sensor 20 includes two tuning fork proof masses 24, 26, a motor charge amplifier 44, a sense charge amplifier 50, a processing device 54, and an output device 56. The proof masses 24, 26 are located above a substrate that includes Coriolis sense electrodes 40 and 42, which are sensitive to out-of-plane proof mass motions. The sensor 20 also includes two in-plane Coriolis sense electrodes 63, which are sensitive to in-plane proof mass motions. Motor driver components 60 are electrically connected to drive combs 62. The motor charge amplifier 44 is electrically connected to sense combs 64.

The proof masses 24, 26 are driven to oscillate at resonance in an X direction. The proof masses 24, 26 are driven to oscillate out of phase by the motor driver components 60. On opposing sides of the proof masses 24, 26 are tines that are interleaved with tines of the drive sense combs 64. The motor charge amplifier 44 outputs a motor signal to the processing device that generates motor driver signals that are sent to the motor drive combs 62 via the motor driver component 60 in order to make sure that the proof masses 24, 26 are driven at the mechanical resonant frequency.

The in-plane Coriolis sense electrodes 63, are asymmetric from the motor drive and drive sense combs 62, 64 of the proof mass 26 in order to allow detection of capacitance change for motion of the proof masses 24, 26 in the Y direction, induced by rotation about the Z axis (the direction perpendicular to the motor motion).

In a first embodiment, both proof masses 24, 26 are electrically connected to the charge amplifier 50 for outputting a voltage signal to the processing device 54. The outputted voltage signal is received by the processing device 54. The voltage signal that is applied to the in-plane Coriolis electrodes 63 is modulated at a first frequency and a voltage signal applied to the out of plane Coriolis electrodes 40 and 42 are modulated at a second frequency that is different than the first frequency. The processing device 54 includes demodulators that demodulate both of the modulation frequencies. The modulation frequencies would be far removed from mechanical resonances of the sensor 20. After the processing device 54 demodulates the received signal based on the first frequency, the processing device 54 analyzes the demodulated signal to determine if a rate of rotation has occurred about the Z-axis. Next, the processing device 54 demodulates the signals received at the second modulation frequency to determine the rate of rotation about the Y-axis. The determined rate of rotation values are outputted via the output device 56.

Figure 3:
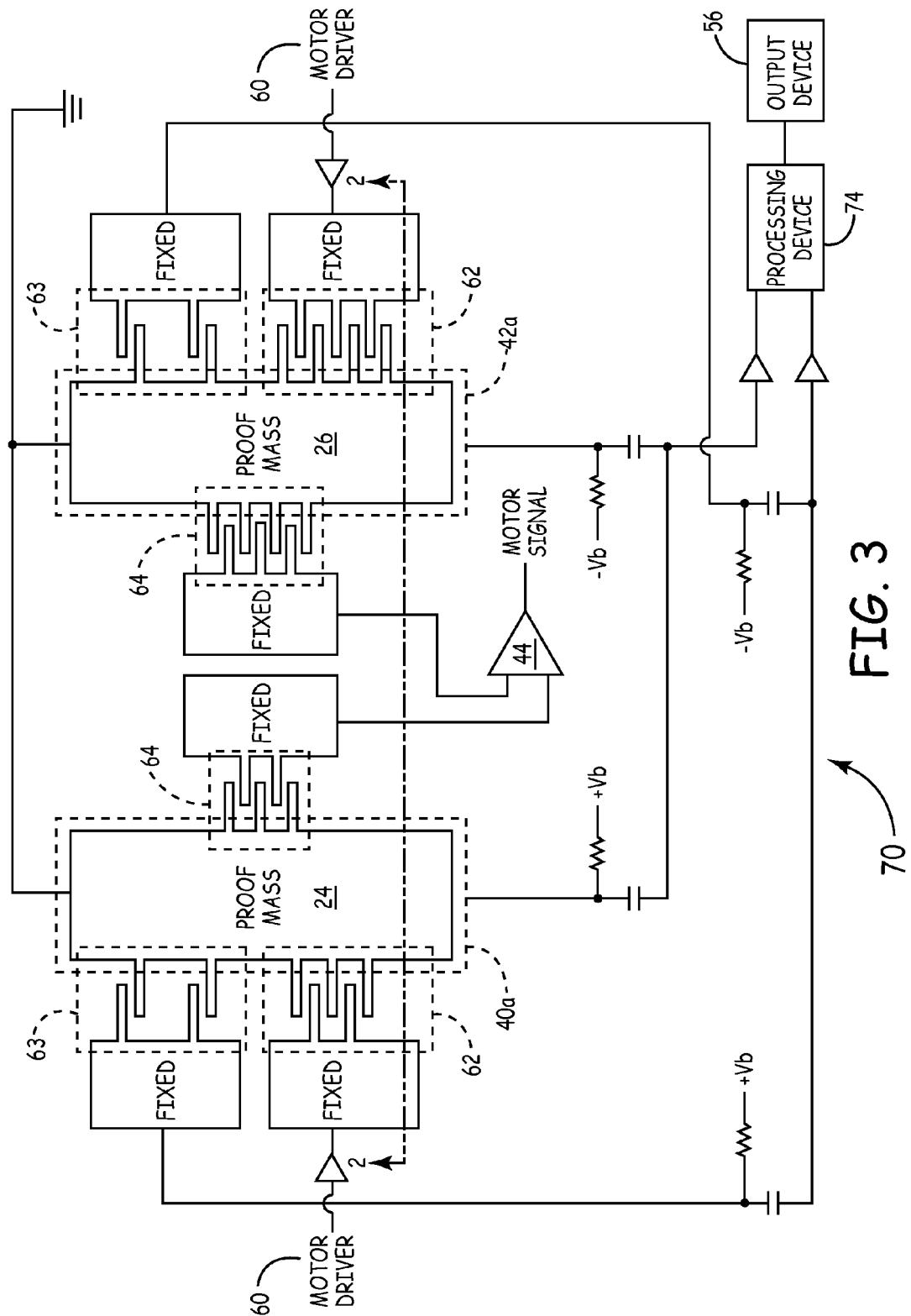
FIG. 3 illustrates a sensor system formed in accordance with an alternate embodiment of the present invention.

FIG. 3 illustrates another example system 70 for sensing rate of rotation about two separate axes. The system 70 includes the same motor drive component 60 proof masses 24, 26, electrodes 40a, 42a, and combs 62, 64 as FIG. 1. The system 70 includes a processing device 74 that receives signals from the electrodes 40a, 42a and from the sense combs 63. In this example, the proof masses 24, 26 are biased to a predefined voltage, such as ground. In one embodiment, the separate processing device 74 is two separate devices for determining rate of rotation values for each axis of rotation. The determined rate of rotation values are outputted via an output device 56.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A two-axes MEMS gyroscope system comprising:
   two proof masses;
   two drive components;
   two drive sense components;
   four Coriolis sense electrodes, two of the Coriolis sense electrodes are sensitive to in-plane proof mass motion and two of the Coriolis sense electrodes are sensitive to out-of-plane proof mass motion; and a processing device in signal communication with at least one of the two proof masses, or the four Coriolis sense electrodes, the processing device being configured to determine rate of rotation about two orthogonal axes based on signals received from at least one of the two proof masses, or the four Coriolis sense electrode, wherein the processing device is configured to demodulate the signals received from the proof masses based on two previously defined modulation frequencies.

2. The system of claim 1, wherein the two drive components and the two drive sense components form comb capacitors with a respective proof mass.

3. The system of claim 1, wherein the two of the Coriolis sense electrodes are biased at a first modulation frequency and the other two Coriolis sense electrodes are biased at a second modulation frequency.

4. The system of claim 2, wherein the proof masses are biased to a predefined voltage, if the processing device receives signals from the four Coriolis sense electrodes.

5. A method for determining rate of rotation about two orthogonal axes in a single MEMS gyroscope system, the method comprising:

driving two proof masses to resonate in plane based on a drive signal;

modulating the two of the four Coriolis sense electrodes at a first frequency;

modulating the other two of the four Coriolis sense electrodes at a second frequency;

receiving signals from at least one of two proof masses or four Coriolis sense electrodes; and determining rate of rotation about two orthogonal axes based on the received signals.

6. The method of claim 5, wherein two drive components and the two drive sensing electrodes form comb capacitors with a respective proof mass.

7. The method of claim 6, wherein determining the rate of rotation includes demodulating the signals received from the proof masses based on the first and the second modulation frequencies.

8. The method of claim 6, further comprising:

biasing the proof masses to a predefined voltage, if the received signals are received from the four Coriolis sense electrodes.

* * * * *

UNITED STATES PATENT AND TRADEMARK OFFICE
CERTIFICATE OF CORRECTION

Page 1 of 1

PATENT NO. : 7,703,324 B2
APPLICATION NO. : 11/747629
DATED : April 27, 2010
INVENTOR(S) : Sutton et al.

It is certified that error appears in the above-identified patent and that said Letters Patent is hereby corrected as shown below:

At Claim 5, Column 4, Line 4, replace "modulating the two of the four" with
--modulating two of the four--

At Claim 5, Column 4, Line 6, replace "modulating the other two" with --modulating another two--

At Claim 5, Column 4, Line 8-9, replace "one of two proof masses, or four Coriolis" with
--one of the two proof masses, or the four Coriolis--

At Claim 5, Column 4, Line 10, replace "determining rate of rotation" with
--determining the rate of rotation--

At Claim 6, Column 4, Line 13, replace "and the two drive" with --and two drive--

Signed and Sealed this
Twenty-fourth Day of July, 2012

David J. Kappos
*Director of the United States Patent and Trademark Office*